Figure 1:
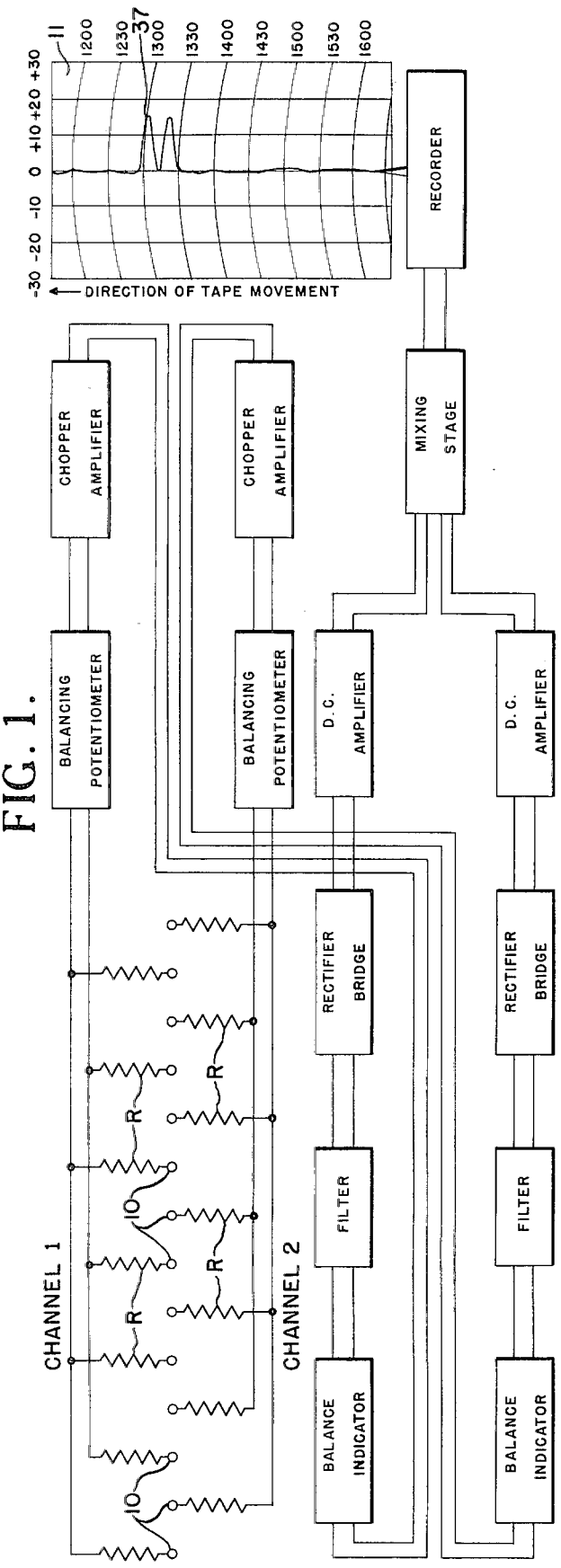

United States Patent [19]
Keck

[11] 3,946,354
[45] Mar. 23, 1976

[54] UNDERWATER ELECTRICAL POTENTIAL DETECTION SYSTEM

[75] Inventor: William G. Keck, East Lansing, Mich.

[73] Assignee: The United States of America as represented by the Secretary of the Navy, Washington, D.C.

[22] Filed: Dec. 8, 1950

[21] Appl. No.: 199,899

[52] U.S. Cl. ............................................. 340/4 E
[51] Int. Cl.² ........................................... G01V 3/08
[58] Field of Search ............ 177/385; 340/4, 5, 4 R, 340/4 E

[56] References Cited
UNITED STATES PATENTS
1,331,640   2/1920   Hahnemann ........................ 340/4 E

*Primary Examiner*—R. A. Farley

EXEMPLARY CLAIM

1. A system of recording the passage of a vessel through a harbor entrance comprising a first plurality of equally spaced devices arranged transversely of the harbor entrance, said devices being adapted to respond to the potential field of a vessel as the vessel moves adjacent thereto, a second plurality of similar devices in alignment with the first devices and spaced midway therebetween respectively, third and fourth pluralities of similar devices alternately spaced midway between said first and second devices respectively and in alignment therewith, a pair of means respectively connected to said first and second and said third and fourth devices for receiving a response signal from said first and second devices and simultaneously receiving a response signal from said third and fourth devices respectively as the vessel moves adjacent thereto, means connected to said pair of means for adding said response signals together to produce a resultant signal, and recording means responsive to said resultant signal for producing a record indicative of the amplitude thereof.

7 Claims, 2 Drawing Figures

INVENTOR.
W. G. KECK
BY
G. D. O'Brien
R. M. Hicks ATTYS.

UNDERWATER ELECTRICAL POTENTIAL DETECTION SYSTEM

The invention described herein may be manufactured and used by or for the Government of the United States of America for governmental purposes without the payment of any royalties thereon or therefor.

This invention relates to the art of harbor defense and more particularly to an improved method and apparatus for detecting and recording at a remote shore station the passage of a vessel through the harbor entrance.

It is well known by those skilled in the art that a steel vessel produces an underwater potential field as a result of the galvanic currents flowing by reason of the potential differences existing between metals in different positions in the electromotive series used in the ships construction when the metals are immersed in a salt solution such as sea water which may be detected by using electrodes placed in the water at points fairly remote from the vessel.

Prior art devices which employ electrodes for detecting and recording the passage of a vessel adjacent thereto have not been found to be entirely satisfactory under all conditions of service for the reason that there are certain "blind spots" in the detecting device (points midway between the electrodes at which a ship crossing over the detecting device is accomplished without producing a signal), or only very weak signals are received by the device for the reason that only one-half of the electrodes received the signal as in the case where the electrodes are placed at points outside the shipping channel and the path of travel of the vessel is parallel therewith.

The present invention contemplates a new and improved method and apparatus for detecting and recording the passage of a vessel through a harbor entrance wherein all of the advantages of the prior art methods and devices are retained and wherein, in addition thereto, provision for dual channel detection is provided whereby the blind spots of the prior art devices are obviated. Otherwise stated, the present invention has provision for a detecting device which may be quickly and easily installed on the bed of the water across a harbor entrance and which operates to record the passage of a vessel at any point thereover to produce a substantially uniform record.

One of the objects of the present invention is to provide a new and improved device for detecting and recording, at a shore station, the passage of a vessel through a harbor entrance.

Another object is to provide such a recording device which may be quickly and easily installed from a cable laying vessel across the harbor entrance.

Another object is to provide a ship detector at a harbor entrance for recording the passage of a vessel, which detector has no blind spots whereby a vessel may pass through the entrance without producing a signal.

A further object is to provide a dual channel detecting arrangement wherein a plurality of spaced electrodes disposed respectively therewithin across a harbor entrance receive signals of opposite polarity as the vessel traverses the electrode channels and wherein the respective channel signals are rectified and thereafter combine to produce a resultant signal for operating the recorder.

A still further object is to provide an electroresponsive system which when placed across a harbor entrance responds to the passage of a vessel therethrough and wherein the response thus obtained is uniform over the entire length of the system.

Figure 2:
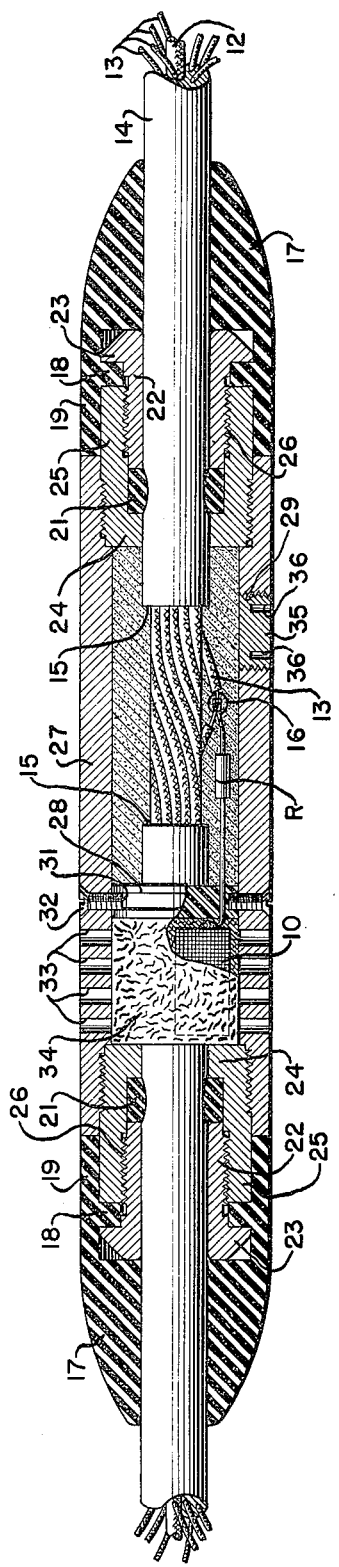

Other objects and many of the attendant advantages of this invention will be readily appreciated as the same becomes better understood by reference to the following detailed description when considered in connection with the accompanying drawings wherein:

FIG. 1 represents in diagrammatic form the preferred embodiment of the complete electrical system of the present invention for detecting and recording the passage of a vessel through a harbor entrance; and FIG. 2 is a view partly in section of a portion of the cable and an electrode used in connection with the present invention.

In order that the features and advantages of the present invention may be better understood, a brief statement will first be made of the art to which the invention appertains. It has been the practice when detecting and recording the passage of a vessel through a harbor entrance to place a number of equally spaced electrodes along the bed and across the entrance of a harbor. These electrodes are arranged in communication with the surrounding water with alternate electrodes connected in parallel to form one side of the recorder input and the remaining electrodes of the system connected in parallel to form the other side of the input to the recorder. In such a system the maximum signal produced in the recorder occurs when the vessel moves directly over an electrode. When the vessel moves at a point midway between adjacent electrodes, the adjacent electrodes produce signals of opposite polarity and equal strength and thus balance the potential to each side of the recorder thereby to cancel out any signal at the recorder.

According to the arrangement of the present invention a pair of channels are provided, the first channel having equally spaced electrodes placed across the harbor entrance, each alternate electrode being connected in parallel to one side of a balancing potentiometer and the remaining electrodes being connected in parallel to the other side of the potentiometer.

A second channel is provided with the electrodes thereof placed midway between the electrodes of the first channel and with each alternate electrode of the second channel connected in parallel to one side of a second balancing potentiometer and the remaining electrodes connected in parallel to the other side of the second potentiometer. The movement of the potential field of the vessel over the electrodes induces a varying electrical signal in adjacent electrodes as the vessel passes thereover, which signals are rectified and combined in a manner to provide the resultant signal aforementioned for operating the recorder. Thus it will be apparent that the point of maximum response to a ship's potential field in one channel comes at the point of zero response in the other channel and the signature of a given vessel produced on the recorder is uniform throughout the full length of the channels.

Referring now more particularly to FIG. 1, there is shown thereon channels 1 and 2, each having alternate mutually spaced electrodes 10 which are placed along the bed of the water and across the harbor entrance.

Each channel is composed of a plurality of resistances R connected respectively in series with the electrodes, such resistances, for example, being 500 ohms and connected in parallel to balancing potentiometers individual to each channel. The signals received by the electrodes of each channel are passed from the potentiometer through a chopper amplifier, a balance indicator, filter, rectifier bridge and thence through a D.C. amplifier. The output of the D.C. amplifiers of both channels of the system are electrically connected to a mixing stage which provides the means for adding the signals to produce the resultant or additive signal and thence to a recorder which records on a moving tape 11 the added signals thus produced from the dual channel arrangement. The various aforedescribed electrical elements are conventional and well known in the art and are therefore illustrated diagrammatically in the drawing.

Referring now more particularly to FIG. 2, there is shown thereon a section of the cable 14 which is laid along the bottom from a cable laying vessel across the harbor entrance. Cable 14 is rubber covered and has a centrally disposed strain core 12 therein with concentrically disposed multiple conductors 13 having assorted colored insulation material arranged about the conductors.

At predetermined spaced intervals, such for example as, 100 feet, the rubber cover is removed from the cable 14 as at 15 and one of the conductors 13 is connected as at 16 to an electrode 10.

The electrodes 10 are preferably formed in the shape of a hemi-cylindrical surface which engages a portion of the periphery of the cable cover. The electrode is preferably composed of pieces of silver gauze formed into a mat of eight adjacent layers and welded along the length thereof to a silver wire. The thoroughly cleaned silver gauze mat is impregnated by dipping the mat into a molten solution of silver chloride. The impregnated meshes are cathodically reduced to a sensitive, stable electrode by immersing the meshes in a solution of 3% C.P. sodium chloride and applying a current of 200 milliamperes per mat for one hour using a platinum anode to obtain an even silver plate on the mat.

The resistor R is interposed in series between the electrode 10 and the conductor 13 and limits the circulatory current flow which might otherwise cause excessive reduction of the silver chloride on the electrode 10.

Sleeved about the cable 14 are a pair of rubber end caps 17 each having an inturned flange portion 18 and a cylindrical inner end portion 19. A pair of tubular members 22 sleeved about the cable 14, are provided with outwardly extending flanges 23 which engage flanges 18, respectively, of the end caps 17.

A pair of coupling members 25 formed of phenolic material are provided with a threaded portion 26 which engages the tubular members 22. A pair of resilient rubber packing glands 21, sleeved about the cable 14 and interposed between the inner end of member 22 and the flanged portion 24 of the coupling member 25, forms a liquid tight seal between the cable 14, member 22 and member 25 as the threads on members 22 and 25 are tightened on each other.

The cylindrical body portion 27, preferably composed of a linen-base laminated phenolic composition, which is arranged about cable 14, is threadably engaged at each end in liquid tight relation with coupling members 25. A phenolic disk 28, having a peripheral groove 31 formed therein, is sleeved about the cable 14 and engages the inner surface of body portion 27. A pair of radially disposed set screws 32 in threaded engagement with the body portion 27, engages groove 31 to prevent lateral movement of the disk 28 with respect to the cable 14.

Body portion 27 is also provided with openings 33 to admit the surrounding water therein to electrode 10 when the cable is laid across the harbor entrance. Glass wool 34 entirely surrounds electrode 10 and fills the space between the disk 28 and the inner end of coupling member 25. The glass wool filters the water which is admitted through openings 33 and prevents foreign matter from engaging the electrode.

A closure cap 35 threadably engages the body 27 to close opening 29. The cap 35 is provided with a pair of detents 36 for receiving the pins of a spanner wrench (not shown) to aid in assembling the cap on the body 27. With the cap 35 removed, a water repellant, sealing and insulating compound is inserted within the body portion for insulating the resistor R, the splice at 16 and the conductors exposed at 15.

When installing the underwater portion of the detecting device, a length of cable 14 sufficient to span the harbor entrance is coiled within a cable laying vessel and the end of the cable secured to an anchor near the shore of the harbor entrance. The cable is payed out as the vessel moves to the opposite shore across the shipping lane where the cable is connected to the recording instrument shown in FIG. 1.

The electrode signals are amplified and recorded on the tape 36 which is driven at a constant speed. It will be understood that, if desired, the speed of the tape may be synchronized and marked in such a manner that the time is recorded on the tape when a ship passes over the detecting electrodes. As previously stated the recording devices are arranged to produce a sum of the signals to produce a "kick" or deflection 37 of the recording pen to one side of the tape center line. When no signal is received the recording pen traces a substantially straight line along the center line of the tape.

It will be noted by inspection of FIG. 1 that the signature produced on the tape at 37 indicates that the vessel was moving over the cable at approximately 1300 hours.

Obviously many modifications and variations of the present invention are possible in the light of the above teachings. It is therefore to be understood that within the scope of the appended claims the invention may be practiced otherwise than as specifically described.

For example, it may be desirable under certain conditions to effect addition of the channel signals by use of a dual coil galvanometer in lieu of a mixing stage hereinbefore described wherein the rectified channel signals are added together.

What is claimed as new and desired to be secured by Letters Patent of the United States is:

1. A system of recording the passage of a vessel through a harbor entrance comprising a first plurality of equally spaced devices arranged transversely of the harbor entrance, said devices being adapted to respond to the potential field of a vessel as the vessel moves adjacent thereto, a second plurality of similar devices in alignment with the first devices and spaced midway therebetween respectively, third and fourth pluralities of similar devices alternately spaced midway between said first and second devices respectively and in alignment therewith, a pair of means respectively connected to said first and second and said third and fourth devices for receiving a response signal from said first and second devices and simultaneously receiving a response signal from said third and fourth devices respectively as the vessel moves adjacent thereto, means connected to said pair of means for adding said response signals together to produce a resultant signal, and recording means responsive to said resultant signal for producing a record indicative of the amplitude thereof.

2. A system of recording the passage of a vessel through a harbor entrance comprising, a pair of channels arranged across the shipping lane along which the vessel will traverse when entering the harbor, a first of said channels comprising a first plurality of equally spaced devices and a second plurality of similar devices spaced midway between said first devices respectively, the second of said channels comprising third pluralities of and fourth pluralities of similar devices alternately spaced midway between said first and second devices respectively, said first and second devices and said third and fourth devices being adapted to produce first and second signals respectively indicative of the electrical potential of the vessel as the vessel passes thereover, a pair of means for receiving the signals from said channels respectively, means responsive to said signals for adding the signals together, and means responsive to said added signals for recording the sum of the signals.

3. A system for recording the passage of a vessel through a harbor entrance comprising, in combination, means including a first plurality of equally spaced electrodes in communication with the surrounding water and arranged along the bed of the entrance of the harbor transversely of the path of travel of the vessel for receiving a signal portion from said vessel when the vessel passes thereover, means including a second plurality of electrodes in communication with the surrounding water and spaced midway between said first electrodes for receiving a signal portion complementary to said first signal portion and together therewith comprising a first signal received from said vessel when the vessel passes over said electrodes, means including a third and fourth plurality of electrodes in communication with the surrounding water and alternately spaced midway between the first and second electrodes respectively for receiving complementary signal portions comprising a second signal received from the vessel when the vessel passes thereover, means for adding said first and second signals together, and means for recording the sum of the first and second signals.

4. A system for recording the passage of a vessel through a harbor entrance comprising, a pair of electrode channels arranged on the bed of the water transversely of the shipping lane of the harbor entrance, the first of said channels having a plurality of equally spaced electrodes in communication with the surrounding water and having each alternate electrode electrically connected together in parallel to one side of the channel, the remaining electrodes of said first channel being electrically connected together in parallel to the other side thereof, the second of said channels having a plurality of electrodes in communication with the surrounding water and respectively disposed midway between the electrodes of the first channel, each alternate electrode of said second channel being electrically connected together in parallel and to one side thereof, the remaining electrodes of the second channel being electrically connected together in parallel and to the other side of the channel, means connected to the output of said channels for adding signals detected thereby and indicative of the strength of the electric field of the vessel at said electrodes as the vessel passes thereover, and means responsive to said added signals for producing a recording of the variations therein.

5. Apparatus for recording the passage of a vessel through a harbor entrance comprising, in combination, a pair of channels arranged on the bed of the water at the harbor entrance transversely of the path of travel of the vessel, the first channel having a plurality of mutually aligned and equally spaced electrodes in communication with the surrounding water, each alternate electrode being electrically connected in parallel, the remaining electrodes being electrically connected in parallel, the second channel having a plurality of electrodes in communication with the surrounding water and arranged midway between the electrodes of the first channel with each alternate electrode of the second channel being electrically connected in parallel, the remaining electrodes of the second channel being electrically connected in parallel, means for receiving a signal from each channel individual thereto as a vessel traverses said electrodes, and means for recording the sum of said signals.

6. Apparatus for recording the passage of a vessel through a harbor entrance comprising, in combination, a first channel comprising a plurality of mutually aligned and equally spaced electrodes submerged within the water across the harbor entrance, each alternate electrode being electrically connected together and the remaining electrodes being electrically connected together, a second channel comprising a plurality of electrodes submerged within the water and arranged in alignment with and midway between the electrodes of the first channel, each alternate electrode of the second channel being electrically connected together and the remaining electrodes of the second channel being electrically connected together, means in said channels and operatively connected to said electrodes individual thereto for receiving a pair of signals in said first and second channels respectively in response to the passage of the vessel over said electrodes, means for separately amplifying and rectifying said signals to produce D.C. signals of the same polarity, and means for adding and recording the sum of the D.C. signals.

7. Apparatus for recording the passage of a vessel through a harbor entrance comprising, in combination, a cable having a plurality of conductors therein and arranged on the bed of the water at the harbor entrance transversely of the path of travel of the vessel, a first plurality of equally spaced electrodes arranged in communication with the surrounding water and electrically connected to a first conductor of said cable, a second plurality of electrodes spaced midway between said first electrodes and arranged in communication with the surrounding water and electrically connected to a second conductor of said cable, a third and fourth plurality of electrodes arranged in communication with the surrounding water and alternately spaced midway between said first and second electrodes respectively, said third and fourth electrodes being electrically connected to a third and fourth conductor respectively of said cable, means operatively connected to said first and second conductors for receiving a first response signal as the vessel traverses said first and second electrodes, means operatively connected to said third and fourth conductors for simultaneously receiving a second response signal as the vessel traverses said third and fourth electrodes, means for adding said first and second response signals together, and means for recording the sum of said response signals.

\* \* \* \* \*